June 3, 1952  R. D. HUBBS  2,599,180
GAUGE
Filed Oct. 1, 1948  2 SHEETS—SHEET 2
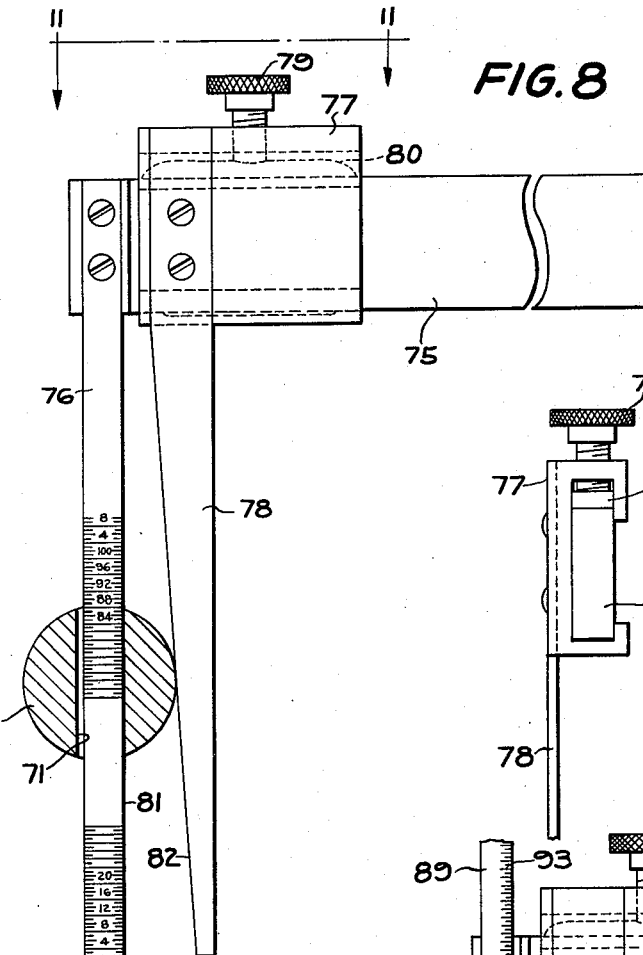
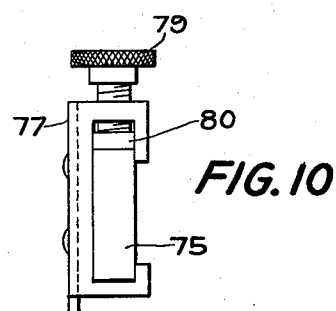
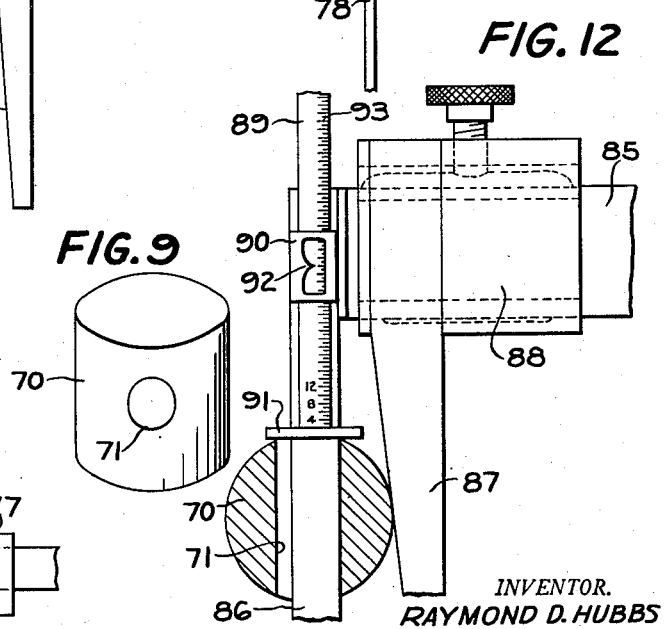
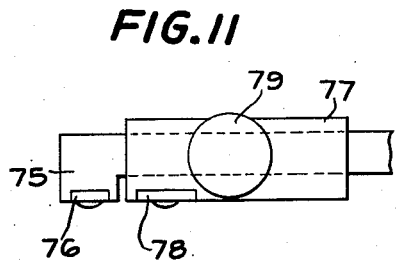
INVENTOR.
RAYMOND D. HUBBS
ATTORNEYS Patented June 3, 1952

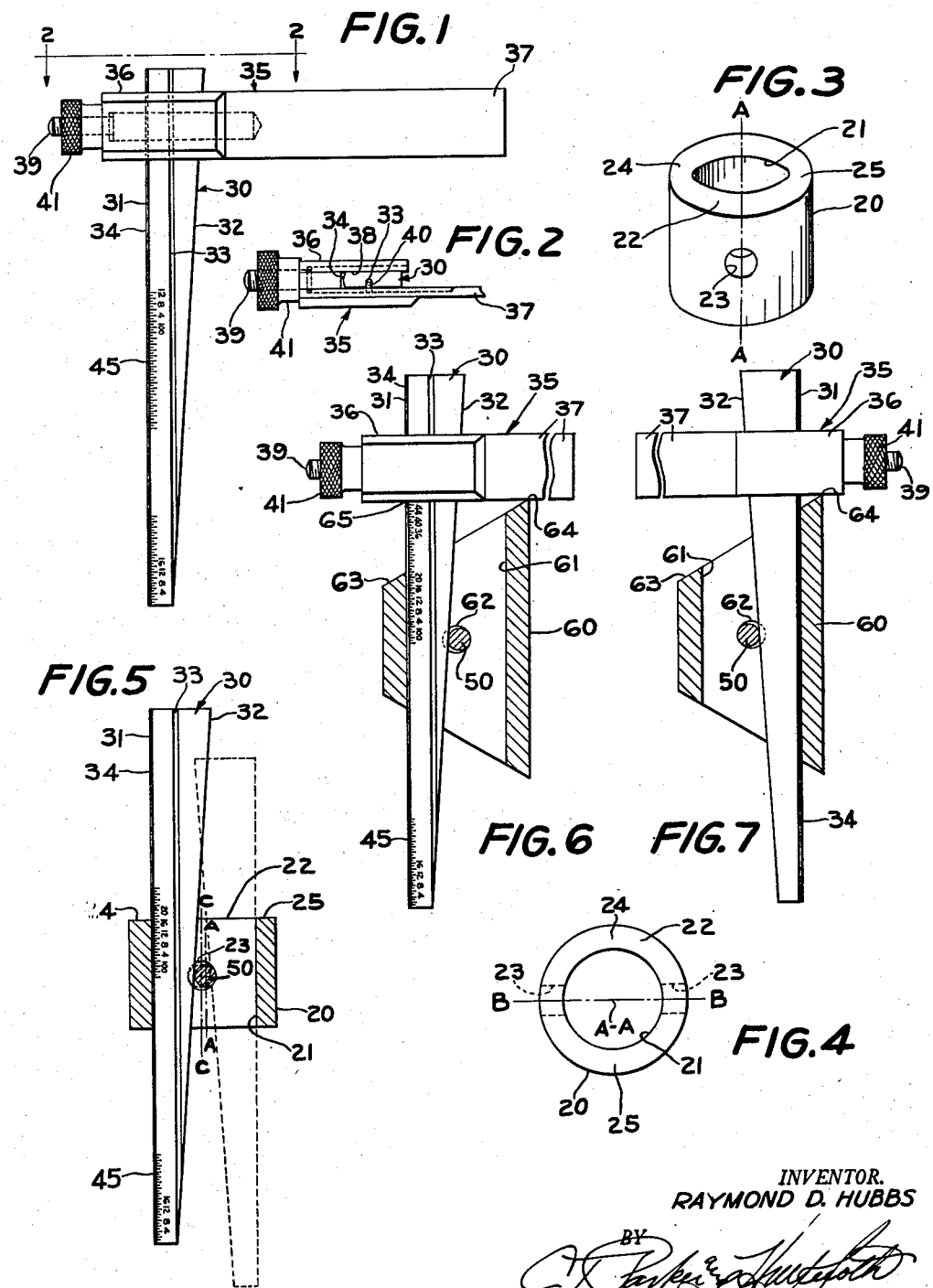

2,599,180

UNITED STATES PATENT OFFICE 2,599,180

GAUGE

Raymond D. Hubbs, East Moline, Ill.

Application October 1, 1948, Serial No. 52,343

1 Claim. (Cl. 33—174)

This invention relates to a gauge and more particularly to an inspection or checking gauge primarily intended for use in checking the relationship between the axes of intersecting surfaces, as in an article which has a bore and an intersecting cross hole or in an article which has an outer cylindrical surface and a cross hole.

In the manufacture of machinery or apparatus it is not uncommon to mass-produce parts such as crank arms or levers according to a pattern in which the part has a bore by means of which the part is mounted on a shaft and in which the part and the shaft are drilled or bored crosswise of the axis of the shaft to provide a cross hole which receives a pin for fixing the part to the shaft. In such cases, it is obvious that the axis of the cross hole must bear the same relationship to the bore in the part as it does to the outer cylindrical surface of the shaft. In the simplest example, the axis of the cross hole should theoretically lie on a diameter of the inner cylindrical surface forming the bore in the part or of the outer cylindrical surface forming the outside diameter of the shaft. It will further be obvious that misalignment of the cross hole with respect to one or the other of the parts will render it difficult if not impossible to insert the connecting pin when the parts are assembled.

Special jigs and fixtures have heretofore been devised for setting up the parts in the drilling or boring operation so that the correct relationship between the bore or outer surface and cross hole will be obtained. However, because of wear in the fixtures incident to use thereof, it is expedient to check these fixtures from time to time to ascertain whether tolerable accuracy is being maintained. The simplest form of check can be made by an inspection of the product itself; that is to say, the relationship between the bore or surface and the cross hole can be measured and the inaccuracy, if any, determined, whereupon the necessary adjustment may be made in the manufacturing equipment if such adjustment is required. As is well known, such checking of the finished articles is made from time to time by inspecting personnel equipped with the necessary instruments.

The instruments heretofore known and used for the purpose of making the inspection referred to above included, among other things, a surface plate, V-blocks, indicators, and height gauges. These instruments had to be set up from time to time according to the particular job and considerable time and effort were involved in making the requisite inspection. In addition, the inaccuracy in the relationship between the bore or surface and the cross hole had to be completed and reduced to familiar units of linear measurement, such as thousandths of an inch, so that it would be known what adjustment to make in the drilling or boring apparatus.

According to the present invention, the complicated system of inspection is eliminated and is replaced by a simple procedure involuving the use of a gauge including means providing a pair of longitudinally extending, non-parallel edges representing respectively the base and the hypotenuse of an imaginary right triangle. The base edge of the gauge is provided with a scale including indicia in the form of a plurality of graduations representing units of linear measurement, such as thousandths of an inch. The taper of the hypotenuse edge, or the angle between the edges, is in thousandths of an inch, for example, and the scale and taper are so related that the taper in thousandths of an inch per inch is twice that of the number of graduations per inch on the scale. In one form of the invention, for the purpose of checking the relationship between a bore and a cross hole, a pin is inserted through the cross hole so as to divide the bore into substantially equal halves; the gauge is inserted into the bore with the scale edge lying along an element of the cylindrical surface forming the bore, the tapered edge engaging the proximate side of the pin. The extent to which the gauge can be inserted between the pin and the proximate surface portion of the bore is determined by the wedging action that occurs between the gauge and the pin. This extent of insertion is read on the scale on the gauge. The gauge is then withdrawn and reinserted at the opposite side of the pin and a similar reading taken on the scale. The two are compared and the difference, if any, in thousandths of an inch is noted. If the difference is within the accepted tolerances, no adjustment need be made in the manufacturing equipment. However, if the difference is outside the accepted tolerances, the reading will immediately indicate to what extent the equipment must be adjusted.

On the basis of the foregoing, it is accordingly a principal object of the invention to provide an improved gauging or inspection means that is simple in construction and accurate and efficient in use and one that may be readily substituted for previously known methods and devices with pronounced savings in time, labor, and skill of personnel involved.

A further important object of the invention is to adapt the gauging means referred to above for use in articles or parts in which the surface surrounding the bore to be checked is irregular, to the end that the comparative readings can be taken on the same or a similar point so that the readings will be accurate. In this respect, it is an object to provide a simple and inexpensive instrument or gauge.

A further object is to utilize the principles of the invention for the purpose of checking the relationship of a cross hole to an external surface, such as in the case of a cylindrical shaft having a cross hole therethrough. In this form of the invention, it is an object to provide a simplified instrument or gauge comprising relatively few moving parts and to provide one of the parts with an easily readable scale which eliminates computation and the application of mathematical formulae.

The foregoing and other important objects and desirable features inherent in and encompassed by the invention will become apparent to those skilled in the art as preferred forms of the invention are fully disclosed in the following detailed description and accompanying sheets of drawings in which:

Figure 1 is a side elevational view of a preferred form of gauge for checking the relationship between a bore and a cross hole;

Figure 2 is an end elevational view of the structure of Figure 1, the view being taken in the direction indicated by the arrows on the line 2—2 of Figure 1;

Figure 3 is a perspective view of a representative article or part on which the gauging or inspecting operation can be performed by the gauge shown in Figures 1 and 2;

Figure 4 is an end elevational view of the part or article shown in Figure 3;

Figure 5 is a view illustrating the procedure in checking the relationship between the bore and cross hole in an article such as illustrated in Figures 3 and 4;

Figures 6 and 7 are views illustrating successive steps in the procedure involved in checking an article or part such as that shown in Figures 3 and 4 but in which such part or article has an irregular surface surrounding the bore;

Figure 8 is a view of a modified form of the invention embodied in a gauge for the purpose of checking the relationship between a cross hole and the outer surface of a shaft, the shaft or part being represented in section in the view;

Figure 9 is a perspective view of such part or shaft;

Figure 10 is an end elevational view of the gauge shown in Figure 8;

Figure 11 is a fragmentary plan elevational view of the gauge shown in Figure 8 as viewed along the line 11—11 of Figure 8; and Figure 12 is a view of a further modified form of instrument.

In the drawings, the gauge shown in Figures 1, 2, 5, 6 and 7 is drawn to a scale in which nine inches equal one foot. The scale of the drawing of the gauge in Figures 8, 10 and 11 is full sized. In each case, due allowance must be made for reduction of the drawings in the printing of patent copies.

As the description progresses, it will become apparent that the principles of the invention may be readily utilized in the gauging or inspection of parts or articles differing somewhat from those illustrated; for example, the parts may have surfaces or configurations differing from those illustrated. Likewise, the calibration of the scale and the relationship of the taper thereto may be made in accordance with units of measurement other than thousandths of an inch. The examples illustrated are representative of part shapes and units of linear measurement most commonly used in this country.

The part to be checked, as shown in Figures 3 and 4, is designated in its entirety by the numeral 20 and is provided with an axial bore 21 which provides a surface of generation about an axis A—A (Figures 3 and 4). The upper surface of the part 20 that surrounds the bore 21 is provided as a substantially flat radial surface 22. The part is further provided with a cross hole 23—23 which theoretically has its axis B—B (Figure 4) coinciding with a diameter of a circle included in the internal cylindrical surface of the bore 21. The line B—B is further included in a plane that intersects the axis A—A of the bore at right angles to said axis. When viewed from above, as in Figure 4, a plane passed axially through the bore 21 and including the axis B—B divides the bore into substantially two equal diametrically opposed hemi-cylindrical portions. Since the flat radial surface 22 is at right angles to the axis A—A, diametrically opposed portions thereof, as at 24—25, will be identically related to the axis B—B of the cross hole 23—23.

The gauging instrument shown in Figures 1, 5, 6 and 7 includes means providing a pair of non-parallel edges. This means in this form of the invention preferably comprises a hardened steel gauge member 30 having non-parallel edges 31 and 32, these edges representing respectively the base and the hypotenuse of an imaginary right triangle. For purposes to be set forth below, the longitudinal gauge member 30 is provided with a groove 33 running lengthwise thereof. Inasmuch as the gauge 30 is intended primarily for use in connection with curved surfaces, the edge 31 is rounded on a slight radius, as indicated at 34 in Figure 2.

The gauge 30 carries for longitudinal adjustment thereon an indicating member 35 which includes a head 36 and a projecting leg portion 37. The head 36 is slotted at 38 (Figure 2) to receive the gauge member 30. A screw 39 passes through the head on an axis normal to the edge 31 of the gauge 30 and has a hooked end 40 that is slidably received in the longitudinal groove 33. An adjusting nut 41 is threaded on the outside end of the screw 39 and serves to hold the indicating member 35 in any selected position on the gauge member 30. The construction may follow closely that of conventional adjustable squares.

The gauge member 30 is provided along the base edge 31 thereof with a scale or indicia 45 in the form of a plurality of graduations or divisions representing units of linear measurement. In the present case, the graduations or divisions of the scale 45 are readable in thousandths of an inch; although, it will be understood that any other units of linear measurement may be substituted therefor. In order that the scale may be readily adapted to the most common inspection procedures, the scale 45 has been constructed so that the distance between each graduation is equal to one-thirty-second part of an inch. Since, as will hereinafter appear, it is only the differences in readings, and not total distances with which the gauge is concerned, the graduations have been numbered at every fourth one thereof from 4 to 100 and the numbering is repeated thereafter. Inasmuch as the graduations are one-thirty-second of an inch apart, there will be thirty-two graduations per inch. In the drawings, certain of the graduations have been omitted to eliminate undue repetition, but it will be understood that the graduations extend throughout the length of that portion of the gauge along the base edge 31.

The taper of the edge 32 is uniform with respect to the base edge 31 and is so constructed that the taper in the aforesaid unit of measurement (thousandths of an inch) per inch is twice the number of graduations per inch on the scale 45. In other words, the scale 45 and the taper of the edge 32 are arranged according to the formula $$T = 2N$$

wherein $T$ = taper in thousandths of an inch per inch, and
$N$ = the number of graduations per inch on the scale 45.

In the present case, there are 32 graduations per inch on the scale 45. Hence, the taper of the edge 32 with respect to the edge 31—or the angular relationship of non-parallelism between the edges—is .064" per inch.

The use of the scale to the extent described will now be set forth in connection with the necessary gauging operations for the checking of the part or article 20, as shown in Figure 5. As an adjunct to the use of the gauge member 30 there is provided a checking pin or member 50 which is inserted in the cross hole 23—23. The pin thus divides the bore 21 into two substantially diametrically opposed hemi-cylindrical portions. It is immaterial whether the pin 50 fits the cross hole 23—23 loosely or tightly, since, as aforesaid, the concern of the gauge is with comparative readings and not total distances.

In Figure 5, the axis of the cross hole 23—23 has been shown off center to the left of the axis A—A, as represented by the line C—C. The pin 50 has a loose fit in the cross hole 23—23. The gauge 30 is inserted as shown with the straight edge 31 lying along an element of the inner cylindrical surface of the bore 21 at the left side of the pin 50, this edge thus engaging a surface portion of the bore 21 diametrically at one side of the pin. The gauge member is inserted so that a wedging action results because of engagement of the edge 31 with the surface portion and engagement of the tapered edge 32 with the left side of the pin 50, the pin being displaced to the right as illustrated. The extent of insertion of the gauge member 30 as aforesaid can be read on the scale 45 by noting the nearest graduation to the radial face portion 24 at the left side of the part 20. In this case, it reads .017 inch. The gauge member 30 is now withdrawn, reversed, an reinserted at the opposite side of the pin 50, as shown in dotted lines in Figure 5. The pin 50 will now be displaced to the left, as indicated; and, since the cross hole 23—23 is actually off center to the left, the gauge member 30 may be inserted to a greater extent than before. The reading can then be taken on the scale 45 at the radial face portion 25. Since, as aforesaid, the radial face portions 24 and 25 bear the same relationship to the true center of the cross hole 23—23, the comparative readings will be arcuate. It will be noted in Figure 5 that the scale, in its dotted line position, has been inserted into the bore to an extent which will give, at 25, a reading on the scale 45 of .034 inch (not shown). The previous reading of .017 is subtracted from the reading .034 inch to give a result of .017 inch, which is the amount that the axis of the cross hole 23—23 is off center as respects the axis A—A of the bore 21.

By way of explanation of the relationship of the tapered edge 32 to the base edge 31, it should be noted, as an important feature of the gauge, that no mathematical computations are necessary; the inspector merely makes the comparative readings as stated above. The elimination of mathematical computations is accomplished by arranging the taper so that it is equal in thousandths of an inch per inch to twice the number of graduations per inch on the scale 45; that is, the taper is .064 inch per inch and there are thirty-two graduations per inch on the scale 45. If the taper were .032 inch per inch as compared to thirty-two graduations per inch on the scale 45, it would be necessary to take the readings at 24 and 25, subtract the smaller from the larger, and divide the result by two, inasmuch as the gauge measures, in effect, the distance between the actual center of the cross hole and the proximate surface of the bore 21 at each side of the axis of the cross hole. However, the difference between the two distances is not the amount that the cross hole is off center as respects the axis A—A, since this difference must be divided by two. For example, take the instance of a circle having a radius of two inches; select a point on a diameter of that circle one inch from the center of the circle. It will be found that the selected point is one inch from the proximate peripheral portion of the circle and three inches from the remote peripheral portion of the circle on the same diameter. Yet, the eccentricity of the point is only one inch. According to the present invention, the computation covering this phase of measurement is built into the gauge. It will be understood, of course, that the same result would follow in the event that different units of linear measurement were used. In the case of checking extremely small parts, wherein the bore and the cross hole would be small, a gauge could be constructed according to the above formula so that the scale 45 would have sixteen graduations per inch, each representing a thousandth of an inch, and the taper of the edge 32 with respect to the edge 31 would be .032 inch per inch. In this respect, among others, the present case differs materially from the ordinary taper gauge heretofore known and used for the purposes of measuring distances between two points. No prior instrument known to applicant has been used for the purpose aforesaid; nor has it included therein the feature of eliminating mathematical computation.

The gauge as used in the checking procedure just described can be used without the indicating member 35, inasmuch as the part 20 is provided with the uniform diametrically opposed portions 24 and 25. However, many cases occur in which the surface surrounding the bore is irregular. Such an instance is illustrated in Figures 6 and 7, wherein a part or article is designated generally by the numeral 60 and is shown as having an axial bore 61 and a cross hole 62. The part is further represented as having an irregular surface 63 at the mouth of the bore 61, this surface having a high point 64. In gauging a part such as this, the cross pin or member 50 is used as in the instance described before, this pin being inserted in the cross hole 62. The gauge 30, carrying the indicating member 35, is used as before; that is, the gauge member 30 is inserted between one side of the pin 50 and the proximate surface of the bore 61. The indicating member 35 is brought down on the member 30 until the leg or arm 37 contacts the high point 64 on the part or article 60. Opposite edges of the head 36 are accurately machined to provide portions cooperating with the scale 45, as at 65 in Figure 6.

The reading on the scale 45 at 65 is 47, which in thousandths of an inch is .047. The scale is withdrawn from the position of Figure 6 and is inserted at the opposite side of the pin as in Figure 7. In this instance, the cross hole 62 is accurate with respect to the axis of the bore 61 and the head 36 of the indicating member engages the high point 64 in such manner that the reading on the scale 45 (not shown in this figure) will be the same as the previous reading. In the event that the cross hole were off center, a difference in the reading would be indicated by a comparison of the readings and the extent of inaccuracy of the cross hole 62 could readily be determined. The underlying principles of the construction and operation as set forth in connection with Figure 5 are inherent in the use of the complete scale as shown in Figures 6 and 7. The indicating arm 37 makes it easy to take a reading on any point fixed with respect to the cross hole 62. In a similar manner, the reading could be taken in relation to the cross pin 50 itself by providing an indicating arm the equivalent of the arm 37 which would extend into the bore for adjustable engagement with the pin 50. However, as a practical matter, the sizes of bores likely to be encountered places too great a limitation upon an alternative means of the type described. On the other hand, it is not outside the scope of the invention to employ the suggested means.

Those principles of the invention embodying the means providing a pair of non-parallel edges in which the taper of one is related to the scale of another in the manner aforesaid is carried over into the modification shown in Figures 8–11. In connection with these figures, a part or article is shown at 70 as representative of a shaft or similar part having an external cylindrical surface intersected by a cross hole 71. The gauge in this case preferably comprises a carrier member 75 which has rigidly fixed to one end thereof a first leg member 76. Opposite lengthwise edges of the carrier member 75 are accurately machined and provide for carrying means in the form of a head 77 to which is affixed a second leg member 78. Both leg members 76 and 78 project alongside each other from the carrier member 75 and are normally spaced apart. Means for varying the spacing between these leg members is provided on the head 77 and carrier member 75, this means taking the form of an adjustable screw 79 which is threaded into the head 77 and which is engageable with a brass or steel slide member 80 for securing any selected position of the head on the carrier member.

The relationship between the leg members 76 and 78 is such as to provide a first or straight edge 81 and a non-parallel or tapered edge 82, the former being on the leg member 76 and the latter being on the leg member 78. The leg 76 is provided along the straight edge 81 with a scale including indicia in the form of graduations similar to those on the member 30; that is, the graduations along the edge 81 are thirty-two per inch and represent thousandths of an inch in the final analysis. The taper of the edge 82 with respect to the edge 81 is the same as the taper of the edge 32 with respect to the edge 31, previously described.

The use of this form of gauge means is indicated in Figure 8. The head 77 is adjusted on the carrier to any selected position sufficient to include the thickness of the indicated part of the shaft 70 between the spaced apart non-parallel edges 81 and 82. This distance is not critical, except as aforesaid, since, as stated above, the gauge means is concerned with comparative readings and not total distances. The leg 76 is inserted into the cross hole 71 with the tapered edge 82 riding on or engaging a portion of the external cylindrical surface of the part 70. The fact that the leg 76 is narrower than the diameter of the cross hole 71 is immaterial, for the reasons stated above. The wedging action that occurs because of the engagement of the legs with the portions indicated determines that the relationship of the components is sufficient to provide for a reading on the scale on the leg 76, which reading is taken at the portion of the part 70 in which the outer cylindrical surface intersects the scale, which in the present instance is a reading of .086 inch. The gauge means is now withdrawn and reinserted so that the leg 78 is at a diametrically opposite portion of the cylindrical surface of the part 70. A second reading is taken and the two readings are compared, the difference, if any, representing the amount in thousandths of an inch that the axis of the cross hole 71 is off from the axis of the cylindrical surface of the part 70.

The description in this respect is abbreviated in the interest of avoiding repetition, since the underlying principles are the same as those discussed above in connection with the gauge member 30. It will be seen that all attributes of the gauge member 30 are present in the gauge member or instrument 75—82.

In the form of the gauge shown in Figure 12, the scale has been placed on an additional member to provide for reduction in over-all size of the gauge. Here, the gauge is similar to that shown in Figures 8–11, and is used for checking the part 70 or a similar part. This gauge includes a carrier 85, a first leg 86 fixed to the carrier, a second leg 87 fixed to a head 88 which is adjustable on the carrier, and measuring means comprising a rod 89 vertically slidably carried at 90 on the carrier and having a T 91 at its lower end. A pointer 92 is provided at 90 for cooperation with a scale 93 on the rod.

The tapered relationship between the proximate edges of the legs 86 and 87 is the same as that between the edges 30 and 31 of the gauge of Figures 1–7 or the edges 81 and 82 of the gauge of Figures 8–11. The scale 93 is constructed like the scale 45 and accomplishes the same result.

In use, the leg 86 is inserted into the cross hole 71 and the tapered edge on the leg 87 utilized to determine the relationship between one side of the cross hole and a point on the outer surface of the part 70. The rod 89 is moved downwardly in the means 90 until the T 91 rests on the upper portion of the part 70 across the cross hole 71. The reading is taken on the scale 93 at 92. The gauge is withdrawn, reversed and the operation repeated at the other side of the part, just as in the case of the gauge of Figures 8–11, except that readings are taken and compared on the scale 93 on the rod 89 rather than directly on the leg, as at 76.

As stated above the units of measurement employed may be varied to suit the particular measurement systems employed. Similarly, the components of the gauges may be made of different sizes to accommodate larger or smaller parts, it being readily conceivable that the gauges could be provided in sets for that purpose, thus eliminating an extremely long universal gauge. These gauges could also be used on parts of polygonal or other sectional shapes. However, either expedient may be resorted to if desired. Other alterations and modifications in the preferred forms of the invention illustrated may be resorted to without departing from the spirit and scope of the invention as defined in the appended claim.

What is claimed is:

For use in gauging an article having a bore and a cross hole crosswise of the bore; gauge means for checking the relationship of the cross hole to the bore, comprising a gauge pin of a diameter no greater than that of the cross hole and adapted to be instered through the cross hole and of sufficient length to extend across the bore so as to be spaced radially from a proximate inner surface of the bore; an elongated gauge member having divergent longitudinal edges and provided along one of said edges with measuring means including indicia representing divisions of a unit of measurement, said divergent edges tapering from a large end of the member wider than the distance between the one side of the gauge pin and the proximate inner surface of the bore to a small end narrower than said distance so that the member may enter and be lightly wedged across said radial space; and an arm carried on the member for adjustment lengthwise of the member and engageable with an external portion of the article and cooperative with said indicia to provide for reading of said indicia as to the extent of entry of the member into said radial space.

RAYMOND D. HUBBS.

REFERENCES CITED

The following references are of record in the file of this patent:

UNITED STATES PATENTS

| Number | Name | Date |
|---|---|---|
| 490,860 | Snoeck | Jan. 31, 1893 |
| 527,581 | Benson | Oct. 16, 1894 |
| 1,649,495 | Soucy | Nov. 15, 1927 |
| 1,715,405 | Bull | June 4, 1929 |
| 2,055,274 | Avery | Sept. 22, 1936 |

FOREIGN PATENTS

| Number | Country | Date |
|---|---|---|
| 17,249 | Great Britain | 1895 |
| 84,286 | Switzerland | July 1, 1920 |
| 311,075 | Germany | Feb. 27, 1919 |
| 805,290 | France | Nov. 16, 1936 |